(12) United States Patent
Raineri

(10) Patent No.: US 6,261,394 B1
(45) Date of Patent: Jul. 17, 2001

(54) METHOD OF LAYING FLOORS WHICH FACILITATES QUICK REPLACEMENT OF MAJOLICA TILES

(76) Inventor: Gabriele Raineri, Via G. Bonaventura, 3-95036, Randazzo (CT) (IT)

( * ) Notice: Subject to any disclaimer, the term of this patent is extended or adjusted under 35 U.S.C. 154(b) by 0 days.

(21) Appl. No.: 09/342,508

(22) Filed: Jun. 29, 1999

(30) Foreign Application Priority Data

Jul. 3, 1998 (IT) .......................................... RM98A0450

(51) Int. Cl.⁷ .................................................. B32B 31/00
(52) U.S. Cl. .............................. 156/63; 156/71; 156/247; 156/344; 52/747.12
(58) Field of Search ............................. 156/71, 247, 344, 156/63; 52/747.12, 745.2, 746.12

(56) References Cited

U.S. PATENT DOCUMENTS

| 3,102,314 | * | 9/1963 | Alderfer . | |
| 4,285,093 | * | 8/1981 | Kundin | 16/17 |
| 5,116,439 | * | 5/1992 | Raus | 156/71 |
| 5,927,033 | * | 7/1999 | Kreckl | 156/71 |

FOREIGN PATENT DOCUMENTS

| 4234792 | | 5/1993 | (DE) . |
| 0043714 | | 1/1982 | (EP) . |
| 0270888 | | 6/1988 | (EP) . |
| 397390 | * | 11/1990 | (EP) . |
| 0763637 | | 3/1997 | (EP) . |
| 2217197 | * | 10/1989 | (GB) . |

* cited by examiner

*Primary Examiner*—Jeff H. Aftergut
(74) *Attorney, Agent, or Firm*—Stevens, Davis, Miller & Mosher, LLP

(57) ABSTRACT

A method of laying floor tiles (5), wherein in order to allow the tiles to be replaced quickly and without noise and dust, tiles (5) are stuck upon laying the same to a removable supporting bed (7) which has been anchored in a removable way to a fixed support (8) conjugated thereto and anchored in turn to floor foundation (9) in a not removable way. Such removable supporting bed has one or more lifting handles which facilitate the pulling up of tiles. The lower surface of removable supporting bed (7) mating the upper surface of fixed support (8) is provided with projections (10) which enter corresponding recesses (11) in the upper surface of fixed support (8) having a shape conjugated to projections (10).

11 Claims, 1 Drawing Sheet

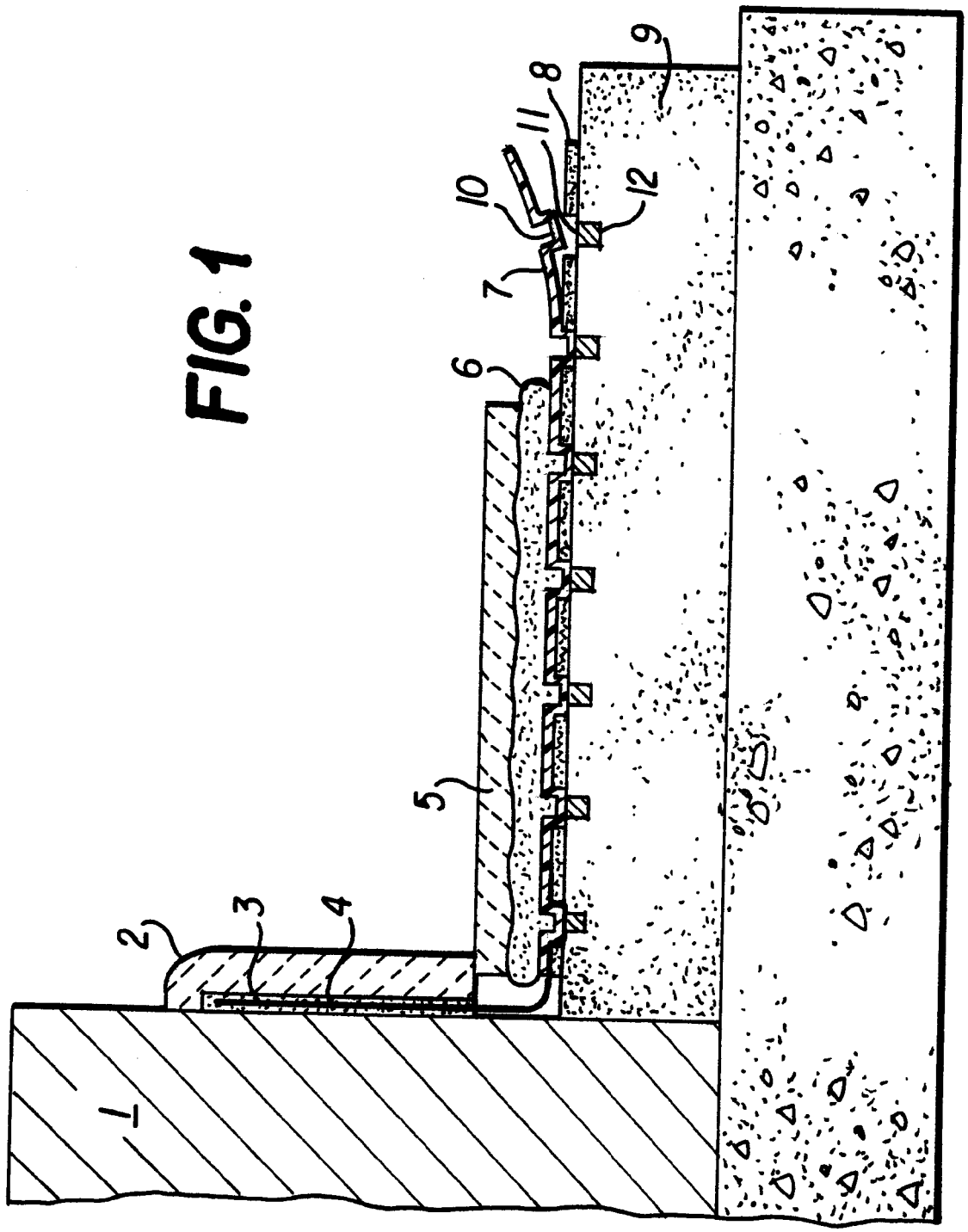

METHOD OF LAYING FLOORS WHICH FACILITATES QUICK REPLACEMENT OF MAJOLICA TILES

FIELD OF THE INVENTION

The present invention relates to building and more particularly a method of laying floor tiles and/or coverings allowing the same to be pulled up quickly in case of their replacement, and means for carrying out such method as well.

BACKGROUND OF THE INVENTION

Destructive operations of coverings and floors tiled with majolica and the like and, if necessary, also the demolition of the floor foundation are currently needed in case of replacement thereof. In such case electric or pneumatic chisels and/or hammers are used causing discomfort as far as noise, dust and rubbles is concerned.

Another problem of the common techniques of pulling up floors and/or coverings is the considerable labour and time needed for such work with the result of an increase in the total cost.

SUMMARY OF THE INVENTION

One object of the invention is to overcome the above-mentioned problems relative to the demolition of floors in order to reduce dust and noise caused by the pulling up of tiles.

A second object of the invention is to strongly reduce the time needed for pulling up the tiles to be replaced.

A third object of the present invention is to allow tiles to be replaced without removing the floor foundation.

Such objects are accomplished by sticking the tiles to a supporting bed to be anchored in a removable way to a fixed support conjugated thereto which is secured in a not removable way to the floor foundation.

A better understanding of the invention will result from the following description with reference to the sole accompanying drawing which shows a preferred embodiment only by way of a not limiting example.

BRIEF DESCRIPTION OF THE DRAWING

FIG. 1 is a sectioned view of the connection portion between floor and wall along a vertical plane perpendicular to floor and wall.

DETAILED DESCRIPTION OF THE PREFERRED EMBODIMENTS

The inventive step involved by the present invention consists substantially of sticking tiles 5 upon their laying to a removable supporting bed 7 which has been anchored in a removable way to a fixed support 8 conjugated thereto and anchored in turn to floor foundation 9 in a not removable way.

In the embodiment shown in the drawing removable supporting bed 7 has a lifting handle 3 that is placed and stuck behind skirting board 2 which is applied to wall 1, as usual, upon laying the floor by adhesive 4 or nails.

According to the invention, removable supporting bed 7 and fixed support 8 are conjugated to each other so that removable supporting bed 7 is applied in a removable way on fixed support 8 in order to guarantee a firm anchoring for the tiles stuck to removable supporting bed 7.

To this end the lower surface of removable supporting bed 7 mating the upper surface of fixed support 8 is provided with projections 10 which enter corresponding recesses 11 in the upper surface of fixed support 8 having a shape conjugated to projections 10. Such projections 10 and recesses 11 have such a shape as to prevent any relative movement of removable supporting bed and fixed support 8 in their lying plane. However, movements perpendicular to such plane are allowed, i.e. any movement causing projections 10 to be removed from recesses 11. As shown if FIG. 1, both projections 10 and recesses 11 have sidewalls that are substantially vertical.

Fixed support 8 is further provided at its lower surface with suitable projections 12 which are embodied into floor foundation 9 upon laying the floor in order that fixed support 8 is reliably secured to floor foundation 9.

According to the invention the floor or covering tiles have to be laid according to the following operating steps in order to allow the subsequent lifting of the tiles to be replaced quickly and without noise and dust:

a) providing a floor foundation 9 and applying the fixed support 8 thereon so that lifting handle(s) 3 is(are) near one wall;

b) positioning removable supporting bed 7 on fixed support 8;

c) applying an adhesive layer 6 on removable supporting bed 7 and laying tiles 5 in the typical way;

d) concealing lifting handle(s) 3 behind skirting board 2 stuck to wall 1.

As mentioned above, if it is requested to remove the tiles, the skirting board is detached so as to show lifting handle(s) 3 which is(are) pulled upwards for lifting removable supporting bed 7 and the tiles stuck thereon. Once the removable supporting bed with the tiles stuck thereon is removed, fixed support 8 is ready for the next set of new tiles stuck on a new removable supporting bed 7 previously laid thereon in the same way as already described.

The operating method according to the present invention allows advantageously floorings which are aesthetically and functionally identical to floorings of the conventional type while giving the possibility of replacing quickly the tiles without using tools or pneumatic hammers or the like and without dust and noise.

Removable supporting bed 7 and fixed support 8 may be of any material tough enough. In particular removable supporting bed 7 consists of a material which is flexible and capable of being deformed enough to allow it to be bent in case the tiles have to be lifted for their replacement.

Another advantage of the invention consists in that fixed support 8 can be used again with or without a new removable supporting bed 7 after tiles to be replaced are lifted and before new tiles are laid. It is self-evident that the present invention can be applied without modifications also to wall coatings.

The present invention has been described and illustrated according to preferred embodiments thereof, however, it should be understood that those skilled in the art can make equivalent modifications and/or replacements without departing from the scope of the present industrial invention.

What is claimed is:

1. A method of laying a member selected from the group consisting of floor and wall tiles, floor coverings and carpets, comprising: sticking the member upon a removable supporting bed (7), the removable supporting bed having been anchored in a removable way to a fixed support (8) conjugated thereto, wherein the fixed support has been anchored in turn to a floor foundation (9) in a not removable way, wherein the lower surface of the removable supporting bed has projections with substantially vertical sidewalls that mate with the upper surface of the fixed support by fitting into corresponding recesses of the fixed support, said recesses having substantially vertical sidewalls.

2. The method of claim 1, comprising the following operating steps:
    a) providing the floor foundation (9) and applying the fixed support (8) thereon so that at least one lifting handle (3) is near a wall (1);
    b) positioning a removable supporting bed (7) on the fixed support (8);
    c) applying an adhesive layer (6) on the removable supporting bed (7) and laying the tiles, coverings or carpets on the removable supporting bed (7);
    d) concealing the at least one lifting handle (3) behind a skirting board (2) stuck to the wall (1).

3. The method of claim 2, wherein to remove the tiles, coverings or carpets, the skirting board (2) is detached to show the at least one lifting handle (3) which is pulled upwards for lifting the removable supporting bed (7) and the tiles, coverings or carpets stuck thereon, whereupon the removable supporting bed (7) together with the tiles, coverings or carpets stuck thereon is removed and the fixed support (8) is ready for the next set of new tiles, coverings or carpets stuck on a new removable supporting bed (7).

4. The method of claim 1, wherein the member is selected from the group consisting of floor tiles and wall tiles, and to remove the tiles a skirting board (2) is detached to show at least one lifting handle (3) which is pulled upwards for lifting the removable supporting bed (7) and the tiles stuck thereon, whereupon the removable supporting bed (7) together with the tiles stuck thereon is removed and the fixed support (8) is ready for the next set of new tiles stuck on a new removable supporting bed (7).

5. Supports for carrying out a method of laying a member selected from the group consisting of floor and wall tiles, floor coverings and carpets, the supports comprising:
    a removable supporting bed (7) and a fixed support (8), wherein the fixed support has been anchored to a floor foundation (9) in a not removable way, wherein the lower surface of the removable supporting bed has projections (10) with substantially vertical sidewalls that mate with the upper surface of the fixed support by fitting into corresponding recesses (11) of the fixed support, the recesses having substantially vertical sidewalls, wherein said removable supporting bed (7) and fixed support (8) are conjugated to each other so that the removable supporting bed is firmly and snugly yet removably anchored to the fixed support.

6. The supports of claim 5, wherein the member is selected from the group consisting of floor tiles and wall tiles, and the member is stuck upon the removable supporting bed.

7. Supports of claim 5, wherein said projections (10) and recesses (11) have such a shape as to prevent any relative movement of the removable supporting bed (7) and the fixed support (8) in their lying plane, whereas movements perpendicular to such plane are allowed.

8. Supports of claim 5, wherein the fixed support (8) is further provided at its lower surface with suitable projections (12) which are embedded into the floor foundation (9) upon laying the floor in order that the fixed support (8) is reliably secured to the floor foundation (9).

9. A method for laying a member selected from the group consisting of carpet, floor coverings, floor tiles and wall tiles, comprising:
    sticking the member upon a removable supporting bed, the removable supporting bed having been anchored in a removable way to a fixed support conjugated thereto; wherein the fixed support has been anchored in turn to a floor foundation in a not removable way; wherein the lower surface of the removable supporting bed has projections that mate with the upper surface of the fixed support by fitting into corresponding recesses of the fixed support; wherein to remove the member a skirting board along an adjacent wall is detached to show at least one lifting handle which is attached to the removable supporting bed; wherein pulling the lifting handle upwards lifts the removable supporting bed and the member stuck thereon, whereupon they are removed and the fixed support is ready for the next set of members on a new removable supporting bed.

10. A method for laying a member selected from the group consisting of carpet, floor coverings, floor tiles and wall tiles, comprising:
    sticking the member upon a removable supporting bed, the removable supporting bed having been anchored in a removable way to a fixed support conjugated thereto; wherein the fixed support has been anchored in turn to a floor foundation in a not removable way; wherein the lower surface of the removable supporting bed has projections that mate with the upper surface of the fixed Support by fitting into corresponding recesses in the fixed support; and wherein the fixed support is anchored to the floor foundation by means of projections on its lower surface which are embedded into the floor foundation upon laying the floor.

11. A method for laying floor or wall tiles comprising:
    laying the tiles upon a removable supporting bed, the removable supporting bed having been anchored in a removable way to a fixed support conjugated thereto, wherein the fixed support has been anchored in turn to a floor foundation in a not removable way, wherein the lower surface of the removable supporting bed has projections that mate with the upper surface of the fixed support by fitting into corresponding recesses of the fixed support.

* * * * *